US005451856A

United States Patent [19]

Girard et al.

[11] Patent Number: 5,451,856

[45] Date of Patent: Sep. 19, 1995

[54] DEVICE FOR THE TRANSMISSION OF ELECTRICAL POWER SIGNALS TO A ROTARY ASSEMBLY

[75] Inventors: Francis Girard, Viroflay; Jean-Pierre G. Pouget, Argenteuil; Christian Roger, Bois Colombes, all of France

[73] Assignee: Societe Hispano Suiza, Saint Cloud Cedex, France

[21] Appl. No.: 281,570

[22] Filed: Jul. 28, 1994

[30] Foreign Application Priority Data

Jul. 28, 1993 [FR] France ................................ 93 09267

[51] Int. Cl.[6] ................................................ H02P 5/28

[52] U.S. Cl. .................................... 318/807; 318/503; 318/521; 318/811

[58] Field of Search ................................ 318/600–603, 318/606–610, 653, 807–811, 818–829, 494–537

[56] References Cited

U.S. PATENT DOCUMENTS

| | | | |
|---|---|---|---|
| 4,527,120 | 7/1985 | Kurosawa | 318/661 |
| 4,529,922 | 7/1985 | Ono | 318/661 X |
| 4,604,575 | 8/1986 | Shimiza et al. | 318/653 X |
| 4,962,331 | 10/1990 | Smith | 318/661 X |

FOREIGN PATENT DOCUMENTS

| | | |
|---|---|---|
| 2521766 | 8/1983 | France . |
| 4029446 | 3/1992 | Germany . |

OTHER PUBLICATIONS

A New Approach to Power Supplies for Robots—IEEE Transactions on Industry Applications 27(1991) Sep./Oct., No. 5, New York pp. 872–875.

Research Disclosure, Mar. 1992, No. 335, Emsworth, GB—Rotary Transformer Power and Data Transfer, p. 165.

Patent Abstracts of Japan, Nov. 16, 1985, vol. 10, No. 87, Inventor: Sugi Tokio—Signal Transmitting Device from Rotary Body.

*Primary Examiner*—David S. Martin

*Attorney, Agent, or Firm*—Oblon, Spivak, McClelland, Maier & Neustadt

[57] ABSTRACT

A device for the transmission of electrical power signals of variable frequencies and phases from a stationary assembly to a rotary assembly wherein the primary winding of a rotary transformer is supplied by an electrical power source of fixed frequency, and the power output from the secondary winding of the transformer is supplied to a chopping feed of a signal generating system including a digital memory storing a digital signal having the desired characteristics of the signal to be generated, a digital-to-analogue converter for receiving the digital signal from the memory under the control of a clock pulse generator, and an amplifier connected to the converter to give the desired power to the analogue signal received from the converter.

16 Claims, 3 Drawing Sheets

DEVICE FOR THE TRANSMISSION OF ELECTRICAL POWER SIGNALS TO A ROTARY ASSEMBLY

BACKGROUND OF THE INVENTION

1. Field of the Invention

The present invention relates to a device for the transmission of electrical power signals of variable frequency and phase from a stationary assembly to a rotary assembly.

2. Summary of the Prior Art

For the transmission of electrical power from a stationary part to a rotating part it is already known, for example from FR-A-2 521 766, to use a rotary transformer having fixed first armature part which carries a primary winding, and a rotary second armature part which faces the first part and carries a secondary winding. This known arrangement is suitable for the transmission of a periodic electric power signal at a fixed frequency (generally an industrial frequency ranging from 50 to 400 Hz) and of known shape (particularly sinusoidal).

However, this arrangement is not suitable when it is desired to obtain on the rotating part an electrical signal of which the shape, the frequency and the phase must be variable to a wide extent and, for optimum output, it is necessary to operate the entire installation at resonance. The voltage/current phase shift may be achieved in the primary circuit by means of a capacitor in a well known manner, but the insertion of a second capacitor into the secondary circuit is difficult to envisage for technical reasons associated with its volume and the rotational speed of the rotary assembly. The consequence is that it is impossible to obtain constant power at the terminals of the secondary circuit if the supply frequency varies between 0 and 10,000 Hz. Moreover, it is impossible to transmit different signals without correspondingly increasing the number of transformers.

SUMMARY OF THE INVENTION

With the aim of overcoming these drawbacks, the invention provides a device for the transmission of electrical power signals of variable frequencies and phases from a stationary assembly to a rotary assembly, comprising a rotary transformer having a fixed first armature part for location on said stationary assembly, a primary winding carried by said fixed first armature part and arranged to be supplied by a fixed frequency electrical power source, a rotary second armature part for location on said rotary assembly facing said first armature part, and a secondary winding carried by said second armature part, and a signal generating system for location on said rotary assembly including a chopping feed connected to receive the power output from said secondary winding, a digital memory in the form of a digital matrix comprising n columns of m elements, said memory storing a digital signal having the desired characteristics of the signal to be generated and the period and amplitude of which are respectively defined by said n columns and said m elements of each column of said memory matrix, a clock pulse generator for controlling the output of said stored digital signal from said memory, a digital-to-analogue converter connected to receive said digital signal output from said memory, and an amplifier connected to said digital-to analogue converter for giving the desired power to the analogue signal from said converter.

The said digital memory may be a read-only memory, an erasable memory, a programmable memory, or a random access memory.

Preferably, the signal generating system of the device includes a counter which increments the n columns of the memory matrix and reloops from the last column to the first, and preferably also includes a counter resetting circuit and an initialization register.

In a particularly useful embodiment, the device includes a control system which enables the introduction of operational parameters in digital form from outside the device. This introduction may be effected by means of an electro-optical chain, preferably incorporated along the axis of the rotary transformer, by means of electro-magnetic radiation in the radio frequency range, or by means of infra-red radiation.

For reasons of convenience, and to make things easier to understand, the invention has been described only in relation to a stationary assembly and a rotary assembly, but it is obvious that the important factor is the relative angular speed existing between the two assemblies. Consequently, it will be appreciated that the invention is also applicable to the case where the two assemblies rotate, either in the same direction or in opposite directions, with relative angular speeds which may vary within a wide range.

DESCRIPTION OF THE PREFERRED EMBODIMENTS

Figure 1:
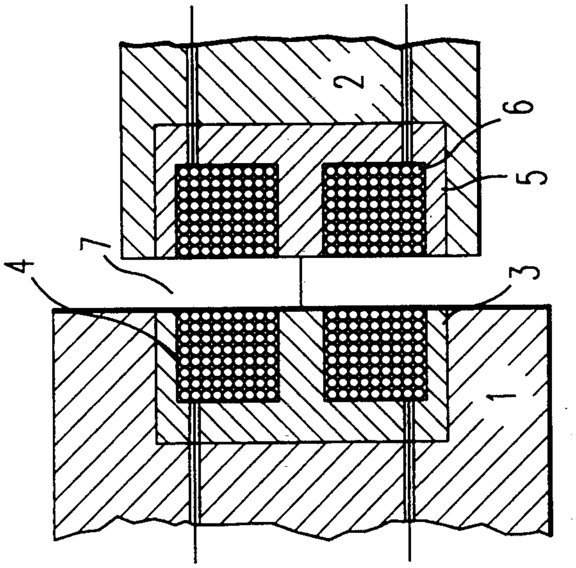
FIG. 1 shows a general representation of a rotary transformer of known type.

The rotary transformer shown in FIG. 1 permits the transmission of electrical power from a stationary assembly 1 to a rotary assembly 2. The transformer comprises a first armature part 3 carried by the stationary assembly 1 and inside which there is a primary winding 4, and a second armature 5 carried by the rotary assembly 2 and inside which there is a secondary winding 6. Obviously, the parts 3 and 5 of the armature are coaxial and separated by as small a gap 7 as possible. This known type of transformer permits transmission of electrical power of industrial frequency, independently of the rotational speed of the rotating part 2.

Figure 2:
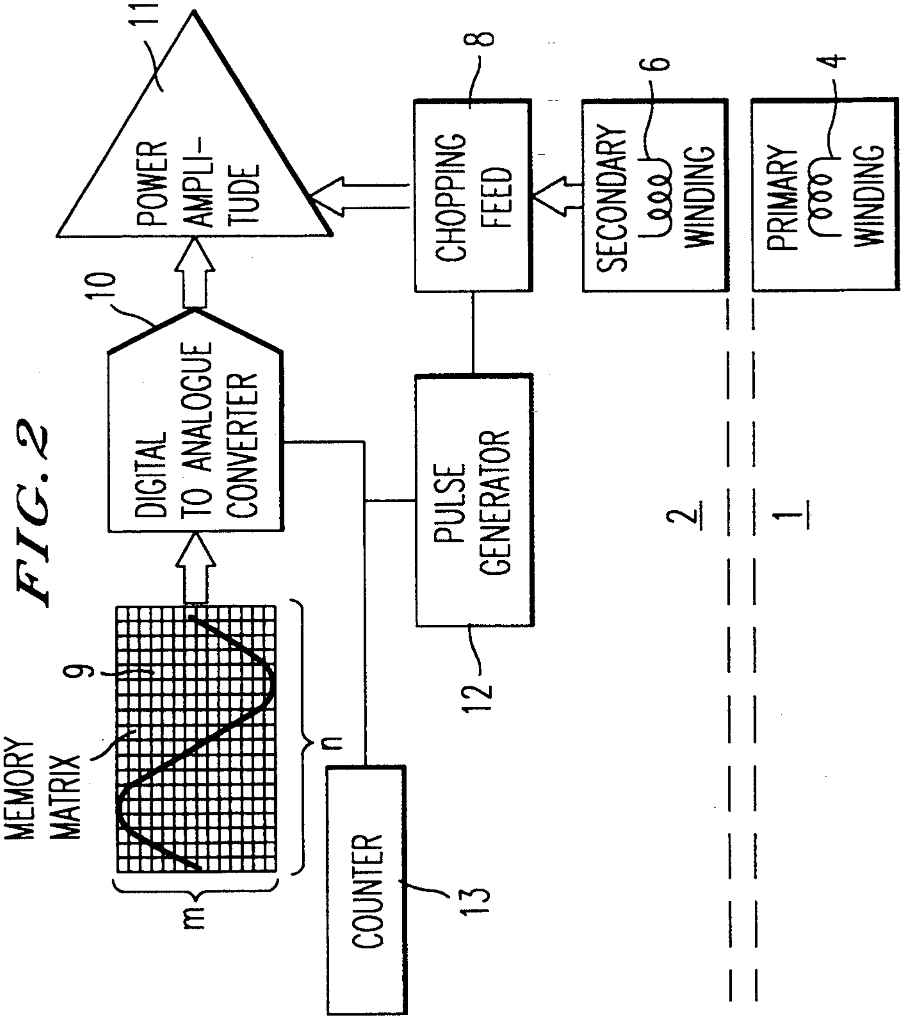
FIG. 2 shows diagrammatically one embodiment of a transmission device in accordance with the invention.

A rotary transformer of the type just described is used in the construction of a device in accordance with the invention, such as the device shown in FIG. 2. In this device the secondary winding 6 transmits electrical power at a fixed frequency in sinusoidal form to a so-called chopping feed 8, of known type, which supplies direct voltage to the various circuits which make up the rest of the device and which are described hereinbelow.

In accordance with the main features of the invention, the shape of the signal that it is desired to achieve on the rotating part is stored digitally in a digital memory 9 in the form of a matrix of n columns with m elements each, where n and m are integers >1. The m elements of each column correspond to the value of the analogue signal expressed in binary form. The binary word gives the resolution of the amplitude of the signal, and the n columns corresponds to the resolution of the period.

This digital memory may be a Read Only Memory (generally termed ROM), an erasable memory (generally termed EPROM), a programmable memory (generally termed PAL), or a Random Access Memory (generally termed RAM). To alter the signal stored in a ROM, EPROM or PAL, it is necessary to act on the component itself. For a RAM, however, the signal may be programmed and erased by a logic circuit controlled by a counter as described hereinbelow.

The formation of the signal is effected by a digital-to-analogue converter 10 which converts into a voltage the value of the binary word presented at its input by the memory, the image of m elements of one of the n columns, and a power amplifier 11 amplifies the analogue signal output from the converter 10.

Figure 3:
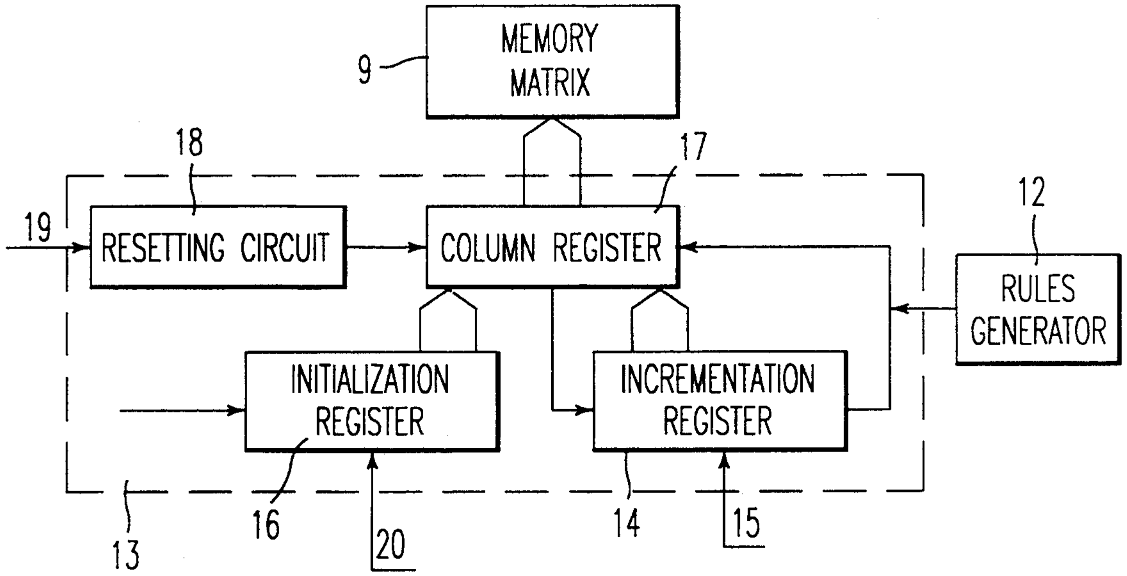
FIG. 3 shows a block diagram of a counter which may be used in a device in accordance with the invention.

A clock pulse generator 612, the actual "metronome" of the device, generates a square wave signal as soon as it is switched on, and controls, in particular, a counter 13. A detailed diagram of one example of the counter 13 is shown in FIG. 3.

The main function of the counter 13 is to increment the n columns of the memory matrix 9 and reloop from the last column to the first, and to present the binary word of each column to the digital-to-analogue converter 10. For this purpose it has an incrementation register 14 having an input for receiving a release signal by which the incrementation may be stopped or restarted at any time. It also has an initialization register 16 having the starting number which a column register 17 has to take, either on energizing the circuit or in response to a command from a resetting circuit 18 which can itself be controlled by an input 19.

The initialization register 16 may receive a programming signal at an input 20.

As indicated above, a certain number of control signals may be transmitted to the device. These relate mainly to the input 15 of the incrementation circuit 14, the input 20 of the initialization circuit 16, and the input 19 of the resetting circuit 18. They may also relate to the amplifier 11 if it is desired to adjust the voltage amplification coefficient, i.e. the amplitude of the signal obtained.

Figure 4:
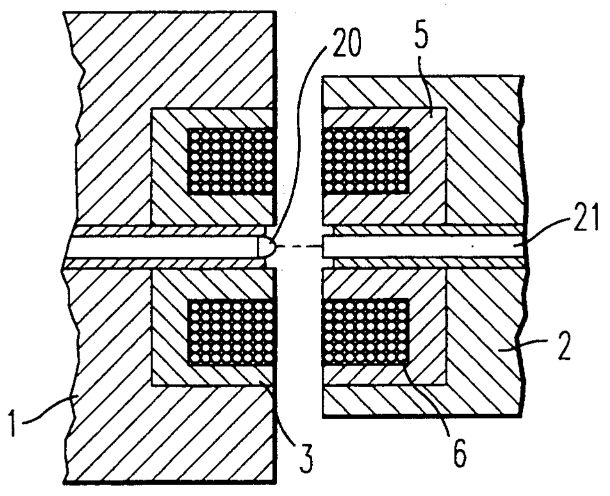
FIG. 4 is a view similar to FIG. 1 but showing a rotary transformer for a device in accordance with the invention permitting the introduction of data electro-optically; and, FIG. 5 is a summary representation of an embodiment in which the device includes several identical systems enabling the device to deliver different signals.

The rotary transformer shown in FIG. 4 is of the type shown in FIG. 1, but is fitted with means permitting an electro-optical connection between the stationary assembly 1 and the rotary assembly 2. For this purpose bores are provided in the fixed armature part 3 and the rotary armature part 5 along their axis. The bore in the fixed part 3 is fitted with a LED 20 which receives the control signals in digital form and transmits them to an optical fibre 21 which is fitted in the bore in the rotary part 5 and is connected to an opto-electrical diode, not shown, to effect the transfer of the data to the circuits of the device carried by the rotary assembly.

The electro-optical transmission method as just described is not the only way of transmitting control signals from the stationary assembly to the rotary assembly. For example, several LED's and several opto-electrical diodes could be combined in various ways with optical fibres. Alternatively, a radio-electrical connection between the assemblies may be made using aerials of fine wires placed facing one another respectively on the fixed and rotary parts, or a connection using infrared radiation could also be employed.

Figure 5:
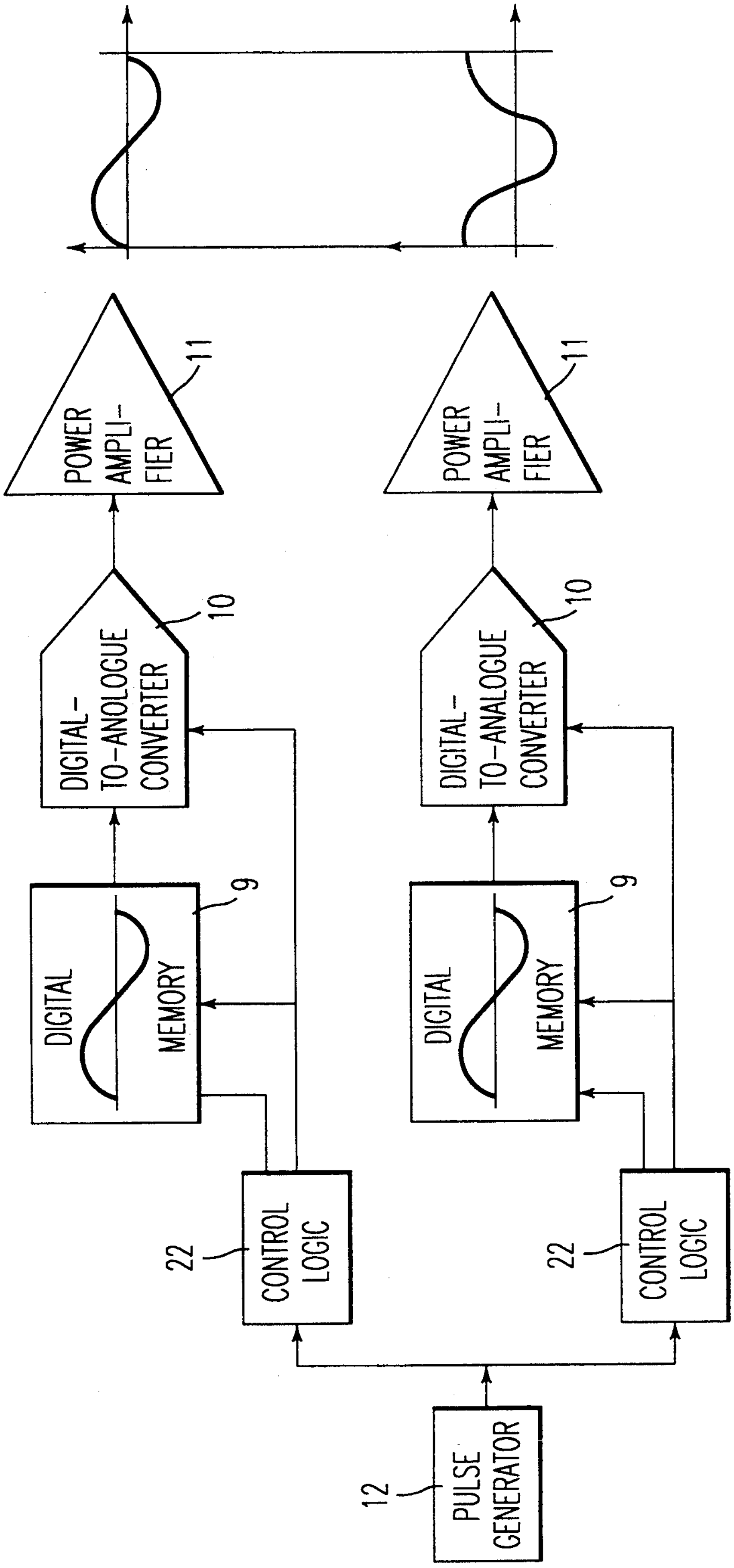

In the device shown in FIG. 5, two identical circuit chains are provided for the rotary part, each having a control logic 22 receiving the signal from a common clock pulse generator 12.

The control logics permit the variations of phase from one signal to the other to be managed as shown in the diagrams situated on the right hand side of FIG. 5.

The device as described herein enables a periodic power signal of any shape with a pass-band which may be at least 10 kHz to be generated on a rotary part. The pass-band will depend on the conversion frequency of the digital-to-analogue converter, the clock frequency, the number of columns in the memory matrix and, finally, the pass band of the amplifier.

We claim:

1. A device for the transmission of electrical power signals of variable frequencies and phases from a stationary assembly to a rotary assembly, comprising a rotary transformer having a fixed first armature part located on said stationary assembly, a primary winding carried by said fixed first armature part and arranged to be supplied by a fixed frequency electrical power source, a rotary second armature part located on said rotary assembly facing said first armature part, and a secondary winding carried by said second armature part, and a signal generating system located on said rotary assembly including means connected to receive the power output from said secondary winding for supplying a direct voltage, a digital memory in the form of a digital matrix comprising n columns of m elements, where n and m are integers >1, said memory storing a digital signal having the desired characteristics of the signal to be generated and the period and amplitude of which are respectively defined by said n columns and said m elements of each column of said memory matrix, a clock pulse generator for controlling the output of said stored digital signal from said memory, a digital-to-analogue converter connected to receive said digital signal output from said memory, and an amplifier connected to said digital-to-analogue converter for giving the desired power to the analogue signal from said converter.

2. A device according to claim 1, wherein said digital memory is of the read only type.

3. A device according to claim 1, wherein said digital memory is of the erasable type.

4. A device according to claim 1, wherein said digital memory is of the programmable type.

5. A device according to claim 1, wherein said digital memory is of the random access type.

6. A device according to claim 5, including a logic system for programming and controlling said digital signal stored in said memory.

7. A device according to claim 1, wherein said clock pulse generator provides a square signal which determines the memory look up rate.

8. A device according to claim 7, wherein said signal generating system includes a counter which has outputs which are sequentially incremented and which are applied as an address to said memory matrix.

9. A device according to claim 8, wherein said counter includes a resetting circuit.

10. A device according to claim 9, wherein said signal generating system includes an initialization register (20) having outputs applied to said counter to initialize the outputs of the counter to apply a a specific address to said memory matrix, both on switching on said device and in response to a reset instruction from said resetting circuit.

11. A device according to claim 1, including means for inputting operational parameters in digital form to said signal generating system.

12. A device according to claim 11, wherein said inputting means comprises an electro-optical means for transmitting said operational parameters between said stationary assembly and said rotary assembly, said electro-optical means including a light emitting diode, an opto-electronic diode, and an optical fibre.

13. A device according to claim 12, wherein said electro-optical means is incorporated in said rotary transformer along the axis of rotation thereof.

14. A device according to claim 11, wherein said inputting means comprises radio-electric means for transmitting said operational parameters between said stationary assembly and said rotary assembly.

15. A device according to claim 11, wherein said inputting means comprises infrared transmission means for transmitting said operational parameters between said stationary assembly and said rotary assembly.

16. A device according to claim 10, including a plurality of said signal generating systems capable of delivering different signals, and means for inputting operational parameters in digital form to said plurality of signal generating systems.

* * * * *

UNITED STATES PATENT AND TRADEMARK OFFICE
CERTIFICATE OF CORRECTION

PATENT NO. : 5,451,856

DATED : September 19, 1995

INVENTOR(S) : GIRARD et al.

It is certified that error appears in the above-indentified patent and that said Letters Patent is hereby corrected as shown below:

In column 3, line 26, change "612" to --12--.

In column 5, line 4, change "apply a" to --apply--.

Signed and Sealed this

Twenty-fifth Day of June, 1996

Attest:

BRUCE LEHMAN

*Attesting Officer* *Commissioner of Patents and Trademarks*